United States Patent
Lich et al.

(10) Patent No.: US 7,400,958 B2
(45) Date of Patent: Jul. 15, 2008

(54) SYSTEM FOR TRIGGERING RESTRAINING MEANS

(75) Inventors: Thomas Lich, Schwaikheim (DE); Rolf-Juergen Recknagel, Jena (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/600,853

(22) Filed: Jun. 20, 2003

(65) Prior Publication Data

US 2004/0059487 A1    Mar. 25, 2004

(30) Foreign Application Priority Data

Jul. 11, 2002    (DE) ................ 102 31 364

(51) Int. Cl.
*G05D 1/00*    (2006.01)

(52) U.S. Cl. ...................................... 701/45

(58) Field of Classification Search ............ 701/45–47, 701/36; 280/728.1, 734–735; 180/271, 274, 180/282; 340/425.5, 435–436
See application file for complete search history.

(56) References Cited

U.S. PATENT DOCUMENTS

| | | | |
|---|---|---|---|
| 4,857,896 A | 8/1989 | Brooks | |
| 5,457,446 A | 10/1995 | Yamamoto | |
| 5,741,049 A | 4/1998 | Sorensen | |
| 5,835,007 A | 11/1998 | Kosiak | |
| 6,160,496 A | 12/2000 | Scheuer | |
| 6,169,479 B1 | 1/2001 | Boran et al. | |
| 6,212,456 B1 * | 4/2001 | Stride | 701/45 |
| 6,361,126 B1 | 3/2002 | Pueschel et al. | |
| 6,408,237 B1 | 6/2002 | Cho | |
| 6,445,306 B1 | 9/2002 | Trovato et al. | |
| 6,463,372 B1 * | 10/2002 | Yokota et al. | 701/45 |
| 6,487,482 B1 * | 11/2002 | Mattes et al. | 701/45 |
| 6,513,831 B2 * | 2/2003 | Stierle et al. | 280/735 |
| 6,749,218 B2 * | 6/2004 | Breed | 280/735 |

FOREIGN PATENT DOCUMENTS

| | | |
|---|---|---|
| DE | 38 11 217 | 10/1989 |
| DE | 100 44 918 | 3/2002 |
| DE | 138 0474 | 1/2004 |
| EP | 937 612 | 8/1999 |
| EP | 110 1657 | 5/2001 |
| EP | 99 5639 | 4/2003 |
| WO | WO 9920491 | 4/1999 |

* cited by examiner

*Primary Examiner*—Yonel Beaulieu
(74) *Attorney, Agent, or Firm*—Kenyon & Kenyon LLP

(57) ABSTRACT

A system for triggering restraining means which has at least one impact sensor and at least one pedestrian-impact sensor, signals being transmitted from these sensors to a processor which is configured such that the processor triggers the restraining means as a function of a linkage of the signals.

17 Claims, 1 Drawing Sheet

SYSTEM FOR TRIGGERING RESTRAINING MEANS

BACKGROUND INFORMATION

The present invention is based on a system for triggering restraining means.

SUMMARY OF THE INVENTION

The system according to the present invention for triggering restraining means has the advantage that not only data from at least one impact sensor are incorporated in the triggering algorithm, but a pedestrian-impact sensor is taken into account as well. This provides the benefit of improving the detection of the impact location and the impact severity and minimizing the danger of a faulty triggering, that is, a misuse. This is because, in particular, a pedestrian-sensor system in the form of a pedestrian-impact sensor is usually located across a large area on the wheels of the vehicle. Conventional impact sensors, on the other hand, are mostly only utilized as up-front sensors, as side-impact sensors, or are located in the central control unit only at particular locations in the vehicle. In this case, the crash type, i.e., the impact location, can therefore only be ascertained via vectorial measurements. In contrast, the system according to the present invention overall improves the triggering of restraining means, such as airbags and belt tighteners.

It is particularly advantageous that the processor determines the crash type and crash severity for the triggering of the restraining means from the linking of the signals from the pedestrian-impact sensor and the impact sensor. In this way, it may be determined which restraining means are to be used and in which way. Especially the type is determined by the time characteristic of the restraining force to be exerted on the passengers inside the vehicle for their protection. If a hard crash is involved, the restraining force must likewise be exerted on the passengers in a correspondingly rapid manner. If only a soft crash has occurred, the power characteristic of an airbag, for example, need not be quite as forceful.

Furthermore, it is advantageous that, in the triggering of restraining means, the processor additionally considers signals from passenger sensors and/or pre-crash sensors. This makes it possible to use only those restraining means that do indeed protect passengers, and not only an empty seat, or which prevent, or at least considerably soften, a use of restraining means in the case of a dangerous seating position of the passenger. Signals from a pre-crash sensor allow, in particular, the timely triggering of restraining means and the use of so-called reversible restraining means, such as reversible belt tighteners or also a pop-up bumper. Furthermore, it is advantageous that the at least one pedestrian-impact sensor may be located in the front and/or in the rear bumper. In the case of frontal or offset crashes, this allows the impact location to be detected with a very precise local resolution since such a pedestrian-impact sensor usually extends over the entire width of the bumper, or at least over a substantial part of this bumper. Moreover, it is also possible for the pedestrian-impact sensor to be located across a large surface on the sides of the vehicle, in the trim molding, for instance. For side crashes, too, this allows a locally precise, resolved large-area detection of the impact location in the front and in the rear region.

It is also advantageous that the at least one impact sensor is embodied in the control device and/or as peripheral sensor, such as an up-front sensor or a side-impact sensor.

DETAILED DESCRIPTION

Figure 1:
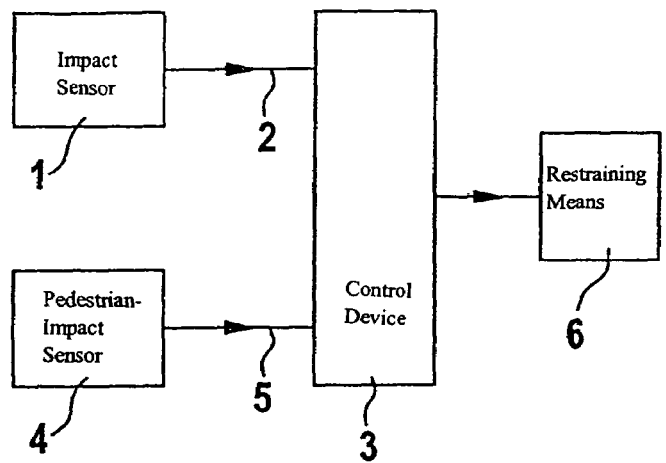
FIG. 1 shows a block diagram of the system according to the present invention.

Currently, a great number of concepts exists with respect to protecting pedestrians, both in the field of sensing and in actuator technology. In most cases, it is bumper sensors that are proposed to detect a pedestrian impact. Force sensors or deformation sensors extending across the entire width of the vehicle in the bumper are used in this connection. Examples of such force sensors are piezofoils, strain gauges, optical sensors or sensors of composite. Among the deformation sensors are light guides or simple switches. In some cases, a plurality of sensors are used to detect the impact location. For the actual protection, airbag systems are essentially integrated in the engine compartment, or otherwise the engine hood is raised in order to counteract the impact of the person involved in the crash.

Airbag control devices which include an acceleration sensor within the control device and additional remote sensors, such as upfront sensors or peripheral sensors as well, if appropriate, already provide excellent triggering times in the event of a crash. According to the present invention, it is provided to improve the detection of the impact location and the impact severity by additionally utilizing the signal from the pedestrian sensory system for the triggering of the restraining means. This additionally permits higher redundancy or plausibility for the use of these restraining means.

The essence of the present invention is generally the processing of data from the pedestrian sensory system in the central control device for the triggering of restraining means. For this purpose, it is also possible to consider other control devices, such as the control devices for the passenger compartment sensing, in addition to the central airbag control device. The advantage in this case is that the pedestrian sensory system usually extends over the entire front region, so that the correct detection of the crash impact, that is, whether an offset crash is involved or possibly a frontal crash, may immediately be derived in a selective manner. Specifically, the crash type can be determined in a more unequivocal way. An additional advantage is the more conclusive detection of the crash severity. Corresponding data regarding the deformation of the vehicle in this region, as a function of the speed, will then result when evaluating the sensor signal. On that basis, the crash severity is able to be determined more clearly next to the acceleration signal, thus providing further information about the crash characteristic. This method may be used for sensing a side crash as well.

The data thus obtained may be considered in the airbag algorithm in a corresponding manner and significantly contributes to the triggering strategy. Furthermore, this signal is used as a plausibility signal in the area of so-called misuse, i.e., the faulty triggering event. If the algorithm detects a frontal impact, the pedestrian-protection sensors must sense an impact too. In the event of a truck underride, this may provide a significant time advantage since the bumper makes contact first in such a case, before the central control device detects an adequate signal. Thus, an improved robustness compared to acceleration sensors, such as an upfront sensor system and a central control device, is obtained. When using a rear sensory system in the bumper, this information may provide analogous data in the case of a rear crash as well.

FIG. 1 shows a block diagram of the system according to the present invention. Via a line 2, an impact sensor 1 is connected to a control device 3 in which a processor is located for evaluating the sensor signals. Via a second data input, control device 3 receives signals from a pedestrian-impact sensor 4, by way of a line 5. Control device 3 is connected to restraining means 6 via a data output.

Here, only one impact sensor 1 is shown by way of example. It is possible that more than this one impact sensor 1 is used; specifically, it is possible for impact sensor 1 to be located in the control device itself. Alternatively, the impact sensor may be provided peripherally, either in addition or instead, i.e., either as upfront sensor under the engine hood, or as side-impact sensor in the A, B, or C-column or the rocker panel or the door, or in a side section itself. Especially an acceleration sensor may be used as impact sensor. As an alternative or in addition, it is possible to employ deformation sensors as well. Piezo sensors or optical sensors are among such deformation sensors, or also indirect deformation sensors, such as temperature or pressure sensors which react to an adiabatic pressure or temperature increase caused by an impact.

Line 2 may in this case be embodied as a two-wire line which allows merely the undirectional transmission of data, from impact sensor 1 to control device 3. In the process, using this line, impact sensor 1 is able to be provided with a d.c. voltage in an advantageous manner, from control device 3 to impact sensor 1. This d.c. current is then modulated by impact sensor 1. However, it is also possible that voltage pulses are modulated and that the energy supply is realized separately from transmission line 2. A bidirectional transmission between impact sensor 1 and control device 3 is possible as well. Furthermore, a bus line between impact sensor 1 and control device 3 may also be used, in which case both include controllers for bus communication. More than one impact sensor may be connected to this bus as well. The same holds for line 5 which connects pedestrian-impact sensor 4 to control they may also be embodied as optical lines or radio transmission paths.

To be used as impact sensor 1, in particular, is an acceleration sensor, which in this case may be a micromechanical sensor. Alternatively, it is also possible to embody it as a switch or as some other spring-mass system. Pedestrian-impact sensor 4 may be a piezo-foil, strain gauge, optical sensor or a sensor made of composite, as represented above. It is also possible to use conductive foamed plastic. As represented earlier, pedestrian-impact sensors 4, of which only one is shown here by way of example, although more than one may be used as well, are preferably located in the front bumper. Alternatively, or additionally, it is also possible to locate such impact sensors in the rear bumper or the sides of the vehicle, for instance in the trim molding. Control device 3, by including a processor such as a micro-controller, is provided with means for evaluating the signals. Control device 3 then triggers restraining means 6 in a triggering algorithm as a function of the evaluation of these sensor signals. Restraining means 6 may here also be connected to control device 3 via a bus or via two-wire lines, as already mentioned. Restraining means 6 are usually airbags or belt tighteners, which may also be triggered in stages. Thus, such restraining means may be used, in particular, adaptively, i.e., as a function of the crash severity and the passenger to be protected. Specifically, it is the weight of the passenger that determines which restraining means are used and in which manner, and whether or not restraining means are to be employed.

Control device 3 then uses both signals, i.e., that from impact sensor 1 and pedestrian-impact sensor 4, to calculate the triggering algorithm. Only when both indicate an impact will restraining means 6 be triggered. Furthermore, the signals from sensors 1 and 4 allow a better determination of the impact location, since especially pedestrian-impact sensor 4 extends across the entire front of the vehicle. In addition, as just shown, the crash severity may be determined in a more optimal manner.

Figure 2:
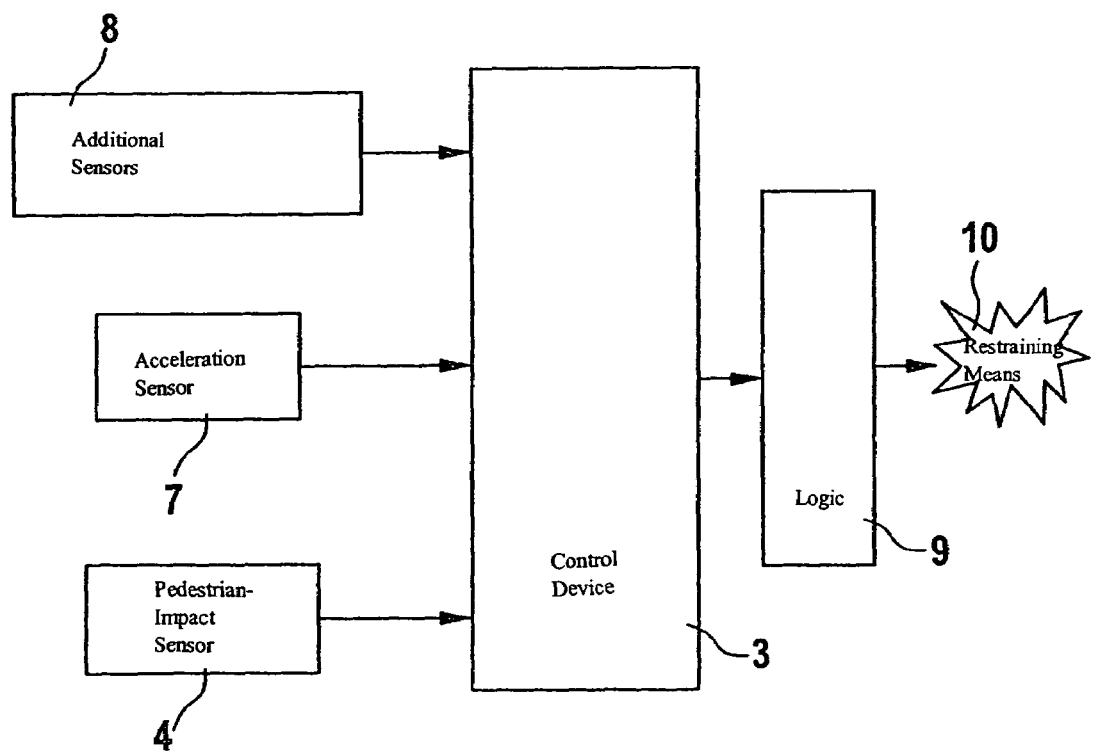
FIG. 2 shows an additional block diagram of the system according to the present invention.

FIG. 2 shows an additional block diagram of the device according to the present invention. Connected to control device 3 in this case are pedestrian-impact sensor 4, an acceleration sensor 7 having sensitivity in, and transversely to, the driving direction, and additional sensors 8. The additional sensors 8 could be side-impact sensors and, in particular, passenger sensors and also pre-crash sensors. Control device 3 processes these data in the trigger algorithm in their entirety, in order to then trigger appropriate restraining means 10 via logic 9. Especially ultrasound sensors and/or video sensors and/or radar sensors may be used as precrash sensors. Additional data, such as communication between vehicles, may be utilized in this context as well.

What is claimed is:

1. A system for triggering at least one restraining device comprising:
   at least one non-pedestrian-impact sensor for transmitting a first signal;
   at least one pedestrian-impact sensor for transmitting a second signal; and
   a processor for receiving the first and second signals, the processor being adapted to trigger the at least one restraining device as a function of a combination of the first and second signals,
   wherein the at least one non-pedestrian-impact sensor includes an acceleration sensor, and
   wherein a first one of the at least one pedestrian-impact sensor is situated in a rear bumper of a vehicle, and a second one of the at least one pedestrian-impact sensor extends across an entire side of the vehicle.

2. The system according to claim 1, wherein the processor determines a crash type and a crash severity from the combination for the triggering of the restraining device.

3. The system according to claim 1, further comprising at least one of (a) at least one passenger sensor and (b) at least one precrash sensor, wherein the processor, in the triggering of the restraining device, further takes signals from the at least one of (a) and (b) into account.

4. The system according to claim 1, wherein the at least one pedestrian-impact sensor is situated in a front bumper of a vehicle.

5. The system according to claim 1, wherein the at least one pedestrian-impact sensor is configured as a side-impact sensor.

6. The system according to claim 1, wherein the at least one non-pedestrian-impact sensor is embodied in a control device.

7. The system according to claim 1, wherein the at least one non-pedestrian-impact sensor includes a peripheral sensor.

8. The system according to claim 1, wherein the at least one non-pedestrian-impact sensor includes a deformation sensor.

9. The system according to claim 8, wherein the deformation sensor includes one of a piezo sensor, an optical sensor, a temperature sensor, and a pressure sensor.

10. The system according to claim 8, wherein the acceleration sensor is one of a micromechanical sensor and a switch.

11. The system according to claim 1, wherein the pedestrian-impact sensor includes at least one of a piezo-foil, a strain gauge, an optical sensor, and a sensor of composite.

12. The system according to claim 5, wherein the at least one pedestrian-impact sensor is situated in a trim molding of a vehicle.

13. The system according to claim 1, wherein the at least one restraining device includes at least one of an airbag and a belt tightener.

14. The system according to claim 1, wherein the processor triggers the at least one restraining device in a gradual manner.

15. The system according to claim 1, wherein the processor triggers a particular one of a plurality of restraining devices based on a passenger weight.

16. The system according to claim 3, wherein the at least one precrash sensor includes at least one of an ultrasound sensor, a video sensor, and a radar sensor.

17. The system according to claim 1, wherein the restraining device is a vehicle-occupant restraining device.

* * * * *